United States Patent
Tzeng

(10) Patent No.: US 11,362,607 B1
(45) Date of Patent: Jun. 14, 2022

(54) MOTOR UNIT

(71) Applicant: Global Mixed-mode Technology Inc., Hsin-Chu (TW)

(72) Inventor: Guang-Nan Tzeng, Hsinchu (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 0 days.

(21) Appl. No.: 17/178,258

(22) Filed: Feb. 18, 2021

(51) Int. Cl.
| | |
|---|---|
| *H02P 6/30* | (2016.01) |
| *H02P 6/08* | (2016.01) |
| *H02P 6/16* | (2016.01) |
| *F04D 27/00* | (2006.01) |
| *H02P 6/26* | (2016.01) |
| *H02K 29/08* | (2006.01) |
| *F04D 25/06* | (2006.01) |
| *H02P 6/22* | (2006.01) |

(52) U.S. Cl.
CPC ............... *H02P 6/30* (2016.02); *F04D 25/06* (2013.01); *F04D 27/00* (2013.01); *H02K 29/08* (2013.01); *H02P 6/085* (2013.01); *H02P 6/16* (2013.01); *H02P 6/22* (2013.01); *H02P 6/26* (2016.02)

(58) Field of Classification Search
CPC .... H02P 6/30; H02P 6/085; H02P 6/16; H02P 6/22; H02P 6/26; H02K 29/08
USPC .................. 318/400.29, 400.26, 400.01, 700
See application file for complete search history.

(56) References Cited

U.S. PATENT DOCUMENTS

| | | | | |
|---|---|---|---|---|
| 6,254,342 | B1* | 7/2001 | Fujinaka | F04D 29/384 |
| | | | | 415/208.5 |
| 7,102,265 | B2* | 9/2006 | Totsu | H02K 3/325 |
| | | | | 310/194 |
| 8,593,098 | B2* | 11/2013 | Paintz | H02P 6/22 |
| | | | | 318/599 |
| 8,723,463 | B2* | 5/2014 | Lin | H02P 6/15 |
| | | | | 318/400.14 |
| 9,614,471 | B2* | 4/2017 | Hijikata | H02P 8/16 |
| 2020/0343845 | A1 | 10/2020 | Zhong | |

FOREIGN PATENT DOCUMENTS

| | | |
|---|---|---|
| TW | 200838119 | 9/2008 |
| TW | 201106606 A1 | 2/2011 |
| TW | 202010236 A | 3/2020 |
| TW | 202013876 A | 4/2020 |

* cited by examiner

*Primary Examiner* — David Luo
(74) *Attorney, Agent, or Firm* — Winston Hsu

(57) ABSTRACT

A motor unit comprises a motor controller, a motor, and a Hall sensor, where the motor controller is used for driving the motor. The motor controller comprises a switch circuit, a control unit, a phase signal generating unit, and an operational amplifier. The control unit generates a plurality of control signals to control the switch circuit. The motor comprises a rotor, a silicon steel plate, and a coil. To increase a success rate of starting a forward rotation, the silicon steel plate may have an asymmetrical structure, such that a fan blade is inclined to a forward rotation direction in a still state. When a Hall voltage is zero, the motor controller may start the motor and switch phases.

20 Claims, 5 Drawing Sheets

MOTOR UNIT

BACKGROUND OF THE INVENTION

1. Field of the Invention

The present invention relates to a motor unit, and more particularly, to a single-phase motor unit.

2. Description of the Prior Art

Conventionally, there are two driving methods for driving a motor. The first driving method uses the Hall sensor for switching phases, so as to drive the motor. The second driving method does not use the Hall sensor to drive the motor. When a single-phase motor system installs a Hall sensor, the Hall sensor must be capable of sensing a voltage which is greater than a start voltage value, so as to rotate forwardly when starting a fan and avoid a risk of rotating reversely. Thus, the Hall sensor tends to result that the system misjudges the rotation direction of the fan under a weak magnetic field state. Similarly, when a single-phase motor system utilizes a sensorless driving method, the system tends to misjudge a rotation direction of a fan if a back electromotive force signal is too small.

SUMMARY OF THE INVENTION

According to the present invention, a motor unit which is capable of increasing a success rate of starting a forward rotation is provided. The motor unit comprises a motor controller, a motor, and a Hall sensor, where the motor controller is used for driving the motor. A fan comprises the motor, a fan blade, and the Hall sensor. The motor comprises a rotor, a silicon steel plate, and a coil. The rotor is divided into two magnetic poles N and two magnetic poles S to switch phases. The coil surrounds the silicon steel plate for driving the rotor based on the magnetic induction resulting in the variation of the magnetic field. To increase the success rate of starting the forward rotation, the silicon steel plate may have an asymmetrical structure, such that the fan blade is inclined to a forward rotation direction in a still state. Furthermore, according to the forward rotation direction of the fan, the Hall sensor may be installed in an advanced position with respect to a zero position of the mechanism, thereby resulting that the motor changes the phase earlier for increasing the success rate of starting the forward rotation.

The motor controller comprises a switch circuit, a control unit, a phase signal generating unit, and an operational amplifier. The switch circuit includes a first transistor, a second transistor, a third transistor, and a fourth transistor for supplying a motor current to the motor. The control unit generates a first control signal, a second control signal, a third control signal, and a fourth control signal so as to respectively control the ON/OFF states of the first transistor, the second transistor, the third transistor, and the fourth transistor. The phase signal generating unit generates a phase signal to the control unit, so as to inform the control unit to switch phases. The Hall sensor detects the position of the rotor and generates a first Hall signal and a second Hall signal. The operational amplifier receives the first Hall signal and the second Hall signal for generating a Hall output signal to the phase signal generating unit. The motor controller utilizes an asymmetrical property of the silicon steel plate to switch phases.

By the asymmetrical silicon steel plate and the installation position of the Hall sensor, the motor controller may start the motor and switch phases when a Hall voltage is zero, where the Hall voltage is generated by the Hall sensor. That is to say, when the motor is in a start state and the difference value between the first Hall signal and the second Hall signal is zero, the phase signal is changed from a first level to a second level, so as to inform the control unit to switch phases. In order to avoid that the first Hall signal and the second Hall signal vibrate near 0 volt, the phase signal generating unit may install an anti-noise circuit to avoid a malfunction. The motor controller may have a first anti-noise mechanism and a second anti-noise mechanism to avoid the malfunction. After the motor controller switches phases, the motor controller may start the first anti-noise mechanism, such that a next phase switching time must be greater than a predetermined time. Furthermore, after the motor controller switches phases, the motor controller may also start the second anti-noise mechanism, such that it is allowed to switch the phase again when the difference value between the first Hall signal and the second Hall signal is greater than a positive value or less than a negative value. For example, the positive value may be 10 mV while the negative value may be −10 mV. Thus, the motor unit will not misjudge the rotation direction of the fan under a weak magnetic field state, thereby avoiding the deadlock of the motor and increasing the success rate of starting the forward rotation.

After the motor controller starts the motor successfully, the motor will change from the start state to a normal operation state. When the motor is in the normal operation state, the motor controller may also switch phases as the Hall voltage is zero. That is to say, when the motor is in the normal operation state and the difference value between the first Hall signal and the second Hall signal is zero, the phase signal is changed from a first level to a second level, so as to inform the control unit to switch phases. Thus, the phase signal generating unit may generate the phase signal for switching phases in the start state or the normal operation state. Furthermore, the motor controller may be applied to a single-phase motor system.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
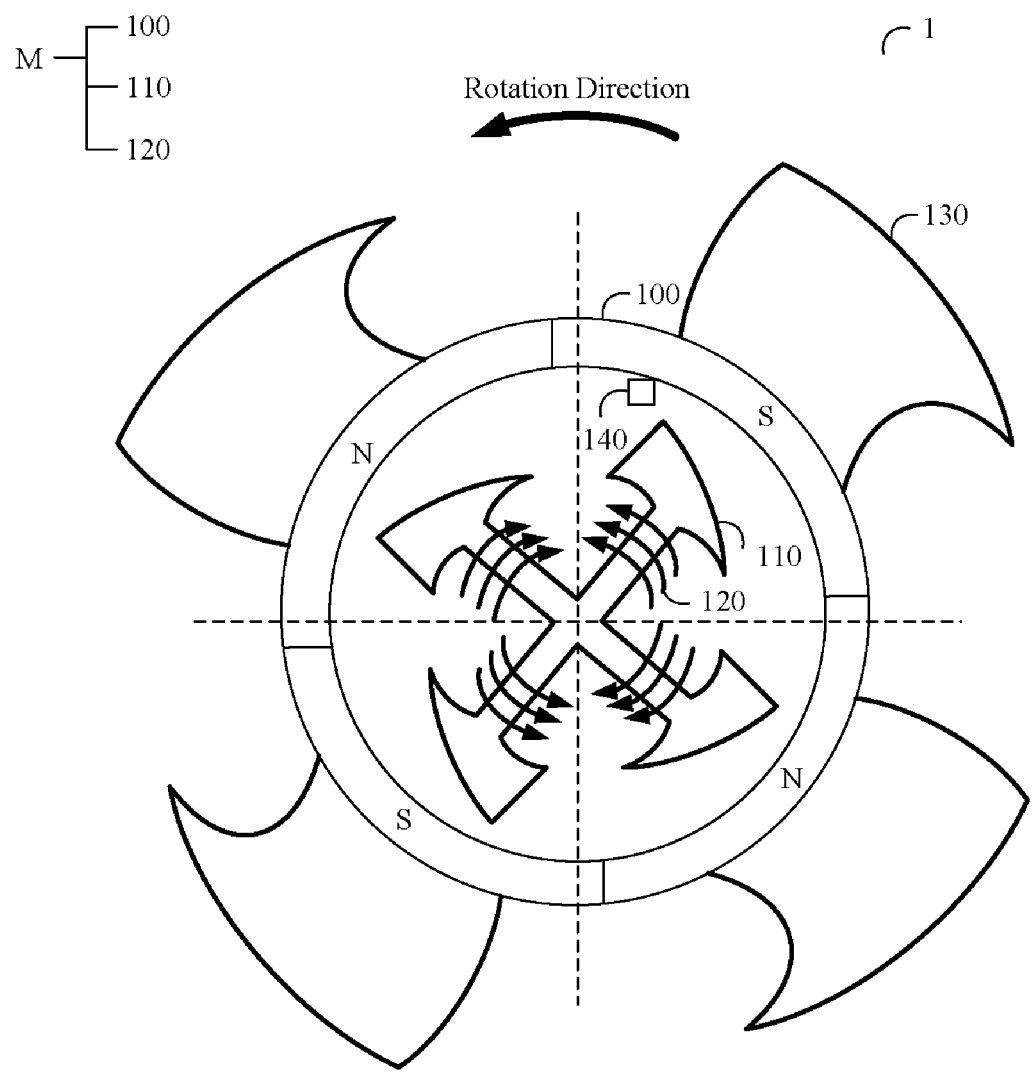
FIG. 1 is a schematic diagram showing a fan according to one embodiment of the present invention.

FIG. 1 is a schematic diagram showing a fan 1 according to one embodiment of the present invention. The fan 1 comprises a motor M, a fan blade 130, and a Hall sensor 140, where a dashed line indicates a zero position of a mechanism. The motor M comprises a rotor 100, a silicon steel plate 110, and a coil 120. The rotor 100 is divided into two magnetic poles N and two magnetic poles S to switch phases. The coil 120 surrounds the silicon steel plate 110 for driving the rotor 100 based on the magnetic induction resulting in the variation of the magnetic field. To increase a success rate of starting a forward rotation, the silicon steel plate 110 may have an asymmetrical structure, such that the fan blade 130 is inclined to a forward rotation direction in a still state. Furthermore, according to the forward rotation direction of the fan 1, the Hall sensor 140 may be installed in an advanced position with respect to the zero position of the mechanism, thereby resulting that the motor M changes the phase earlier for increasing the success rate of starting the forward rotation.

Figure 2:
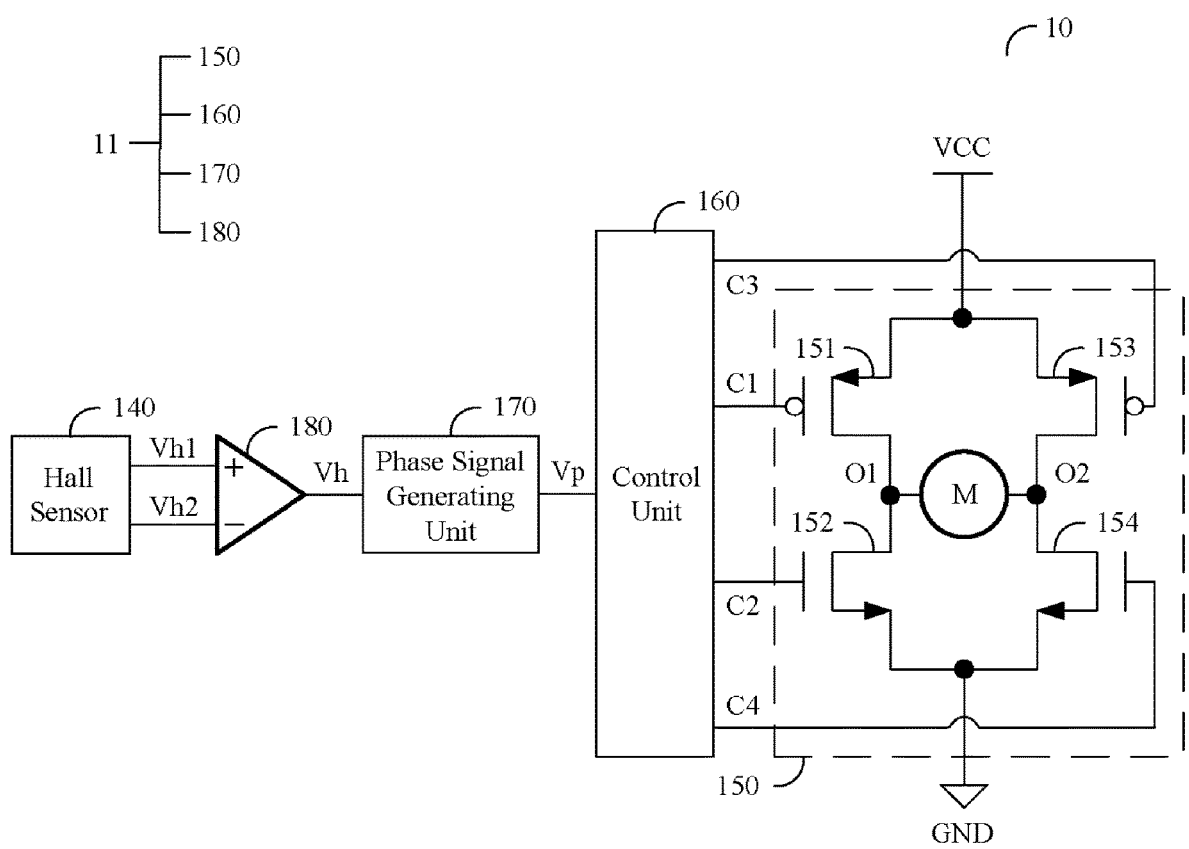
FIG. 2 is a schematic diagram showing a motor unit according to a first embodiment of the present invention.

FIG. 2 is a schematic diagram showing a motor unit 10 according to a first embodiment of the present invention. The motor unit 10 comprises a motor controller 11, the motor M, and the Hall sensor 140, where the motor controller 11 is used for driving the motor M. The motor M has a first terminal O1 and a second terminal O2. The motor controller 11 comprises a switch circuit 150, a control unit 160, a phase signal generating unit 170, and an operational amplifier 180. The switch circuit 150 includes a first transistor 151, a second transistor 152, a third transistor 153, and a fourth transistor 154 for supplying a motor current to the motor M. The first transistor 151 is coupled to a voltage source VCC and the first terminal O1 while the second transistor 152 is coupled to the first terminal O1 and a ground GND. The third transistor 153 is coupled to the voltage source VCC and the second terminal O2 while the fourth transistor 154 is coupled to the second terminal O2 and the ground GND. Each of the first transistor 151, the second transistor 152, the third transistor 153, and the fourth transistor 154 may be respectively a p-type MOSFET or an n-type MOSFET. As shown in FIG. 2, each of the first transistor 151 and the third transistor 153 may be a p-type MOSFET, while each of the second transistor 152 and the fourth transistor 154 may be an n-type MOSFET.

The control unit 160 generates a first control signal C1, a second control signal C2, a third control signal C3, and a fourth control signal C4 so as to respectively control the ON/OFF states of the first transistor 151, the second transistor 152, the third transistor 153, and the fourth transistor 154. The phase signal generating unit 170 generates a phase signal Vp to the control unit 160, so as to inform the control unit 160 to switch phases. The Hall sensor 140 detects the position of the rotor 100 and generates a first Hall signal Vh1 and a second Hall signal Vh2. The operational amplifier 180 receives the first Hall signal Vh1 and the second Hall signal Vh2 for generating a Hall output signal Vh to the phase signal generating unit 170. The operational amplifier has an amplification ratio A. The motor controller 11 utilizes an asymmetrical property of the silicon steel plate 110 to switch phases.

By the asymmetrical silicon steel plate 110 and the installation position of the Hall sensor 140, the motor controller 11 may start the motor M and switch phases when a Hall voltage is zero, where the Hall voltage is generated by the Hall sensor 140. That is to say, when the motor M is in a start state and the difference value between the first Hall signal Vh1 and the second Hall signal Vh2 is zero, the phase signal Vp is changed from a first level to a second level, so as to inform the control unit 160 to switch phases. In order to avoid that the first Hall signal Vh1 and the second Hall signal Vh2 vibrate near 0 volt, the phase signal generating unit 170 may install an anti-noise circuit to avoid a malfunction. The motor controller 11 may have a first anti-noise mechanism and a second anti-noise mechanism to avoid the malfunction. After the motor controller 11 switches phases, the motor controller 11 may start the first anti-noise mechanism, such that a next phase switching time must be greater than a predetermined time. Furthermore, after the motor controller 11 switches phases, the motor controller 11 may also start the second anti-noise mechanism, such that it is allowed to switch the phase again when the difference value between the first Hall signal Vh1 and the second Hall signal Vh2 is greater than a positive value or less than a negative value. For example, the positive value may be 10 mV while the negative value may be −10 mV. Thus, the motor unit 10 will not misjudge the rotation direction of the fan 1 under a weak magnetic field state, thereby avoiding the deadlock of the motor M and increasing the success rate of starting the forward rotation.

Figure 3:
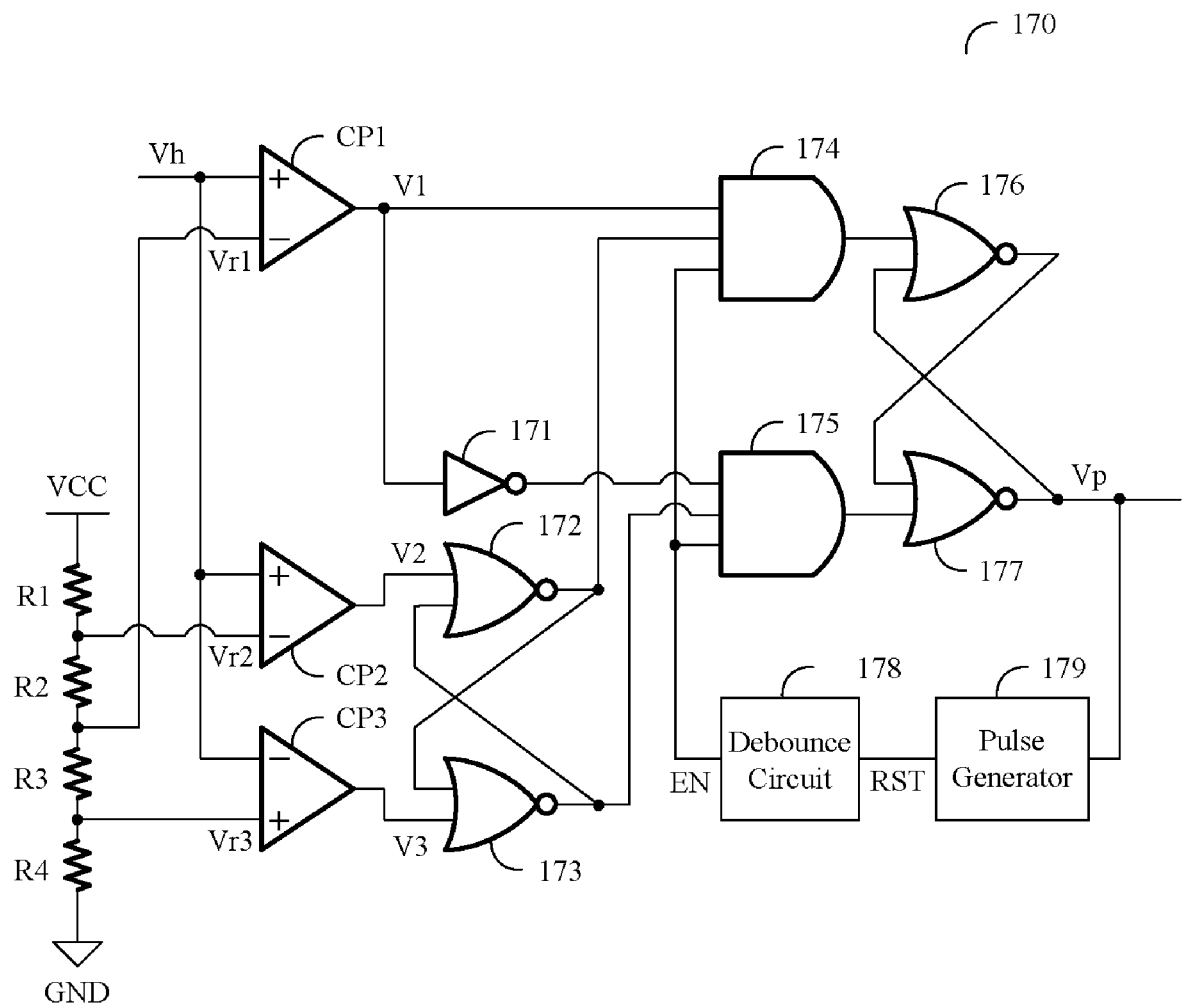
FIG. 3 is a schematic diagram showing a phase signal generating unit according to the first embodiment of the present invention.
Figure 4:
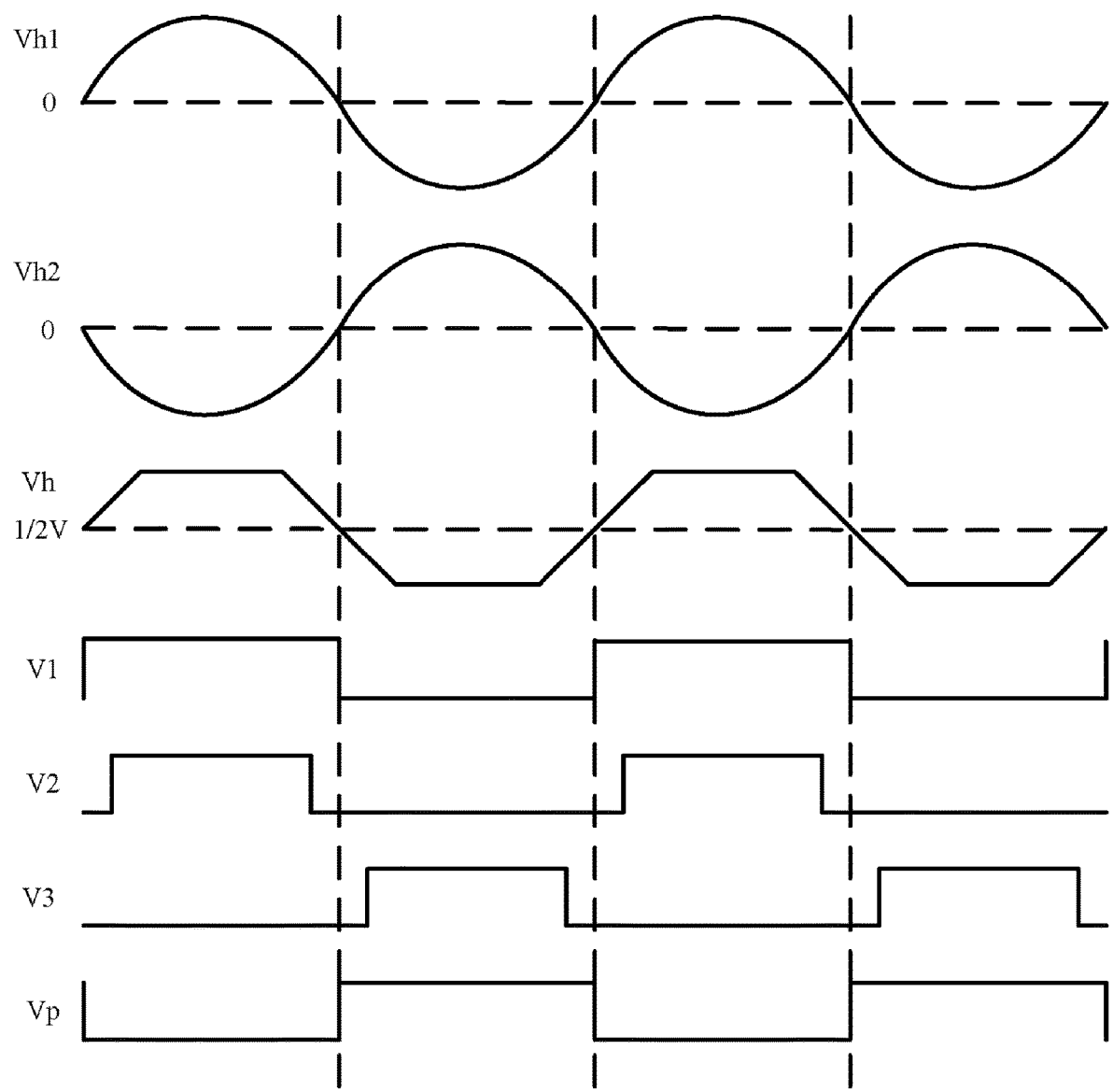
FIG. 4 is a timing chart according to the first embodiment of the present invention.

FIG. 3 is a schematic diagram showing the phase signal generating unit 170 according to the first embodiment of the present invention. The phase signal generating unit 170 comprises a first resistor R1, a second resistor R2, a third resistor R3, a fourth resistor R4, a first comparator CP1, a second comparator CP2, a third comparator CP3, an inverter 171, a NOR gate 172, a NOR gate 173, an AND gate 174, an AND gate 175, a NOR gate 176, a NOR gate 177, a debounce circuit 178, and a pulse generator 179. The first resistor R1, the second resistor R2, the third resistor R3, and the fourth resistor R3 constitute a voltage divider, so as to respectively provide a first reference voltage Vr1, a second reference voltage Vr2, and a third reference voltage Vr3 to the first comparator CP1, the second comparator CP2, and the third comparator CP3. The voltage divider is coupled to the voltage source VCC and the terminal GND, where the voltage source VCC has a voltage V. The NOR gate 176 and the NOR gate 177 constitute a first SR latch while the NOR gate 172 and the NOR gate 173 constitute a second SR latch. FIG. 4 is a timing chart according to the first embodiment of the present invention. When the first Hall signal Vh1 is zero and the second Hall signal Vh2 is zero, the Hall output signal Vh is biased at ½V. Therefore, the first reference voltage Vr1 may be designed to be equal to ½V. The first comparator CP1 generates a first signal V1 to switch phases by comparing the Hall output signal Vh with the first reference voltage Vr1. The pulse generator 179 receives the phase signal Vp for generating a reset signal RST to the debounce circuit 178. When the phase signal Vp is changed, the debounce circuit 178 may output an enable signal EN to the AND gate 174 and the AND gate 175 based on the reset signal RST, so as to generate the predetermined time and enable the next phase switching time to be greater than the predetermined time. So, the debounce circuit 178 may avoid the malfunction. The second reference voltage Vr2 may be designed to be equal to ½V+(the positive value×A). The third reference voltage Vr3 may be designed to be equal to ½V+(the negative value×A). The second comparator CP2 generates a second signal V2 by comparing the Hall output signal Vh with the second reference voltage Vr2. The third comparator CP3 generates a third signal V3 by comparing the Hall output signal Vh with the third reference voltage Vr3. The phase signal generating unit 170 utilizes the second signal V2 and the third signal V3, such that it is allowed to switch the phase again when the difference value between the first Hall signal Vh1 and the second Hall signal Vh2 is greater than the positive value or less than the negative value. The second comparator CP2, the third comparator CP3, the AND gate 174, the AND gate 175, the debounce circuit 178, and the pulse generator 179 may constitute the anti-noise circuit.

After the motor controller 11 starts the motor M successfully, the motor M will change from the start state to a normal operation state. When the motor M is in the normal operation state, the motor controller 11 may also switch phases as the Hall voltage is zero. That is to say, when the motor M is in the normal operation state and the difference value between the first Hall signal Vh1 and the second Hall signal Vh2 is zero, the phase signal Vp is changed from a first level to a second level, so as to inform the control unit 160 to switch phases. Thus, the phase signal generating unit 170 may generate the phase signal Vp for switching phases in the start state or the normal operation state. Furthermore, the motor controller 11 may be applied to a single-phase motor system.

Figure 5:
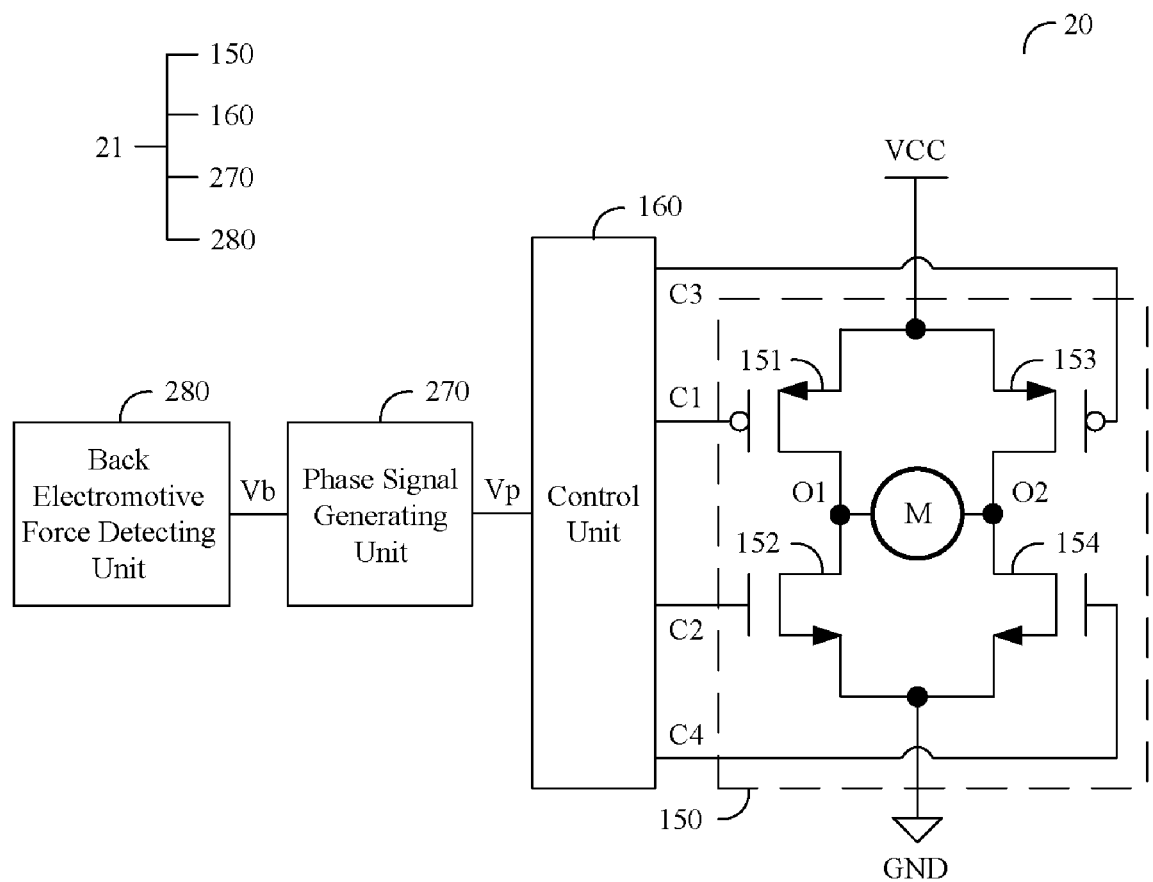
FIG. 5 is a schematic diagram showing a motor unit according to a second embodiment of the present invention.

FIG. 5 is a schematic diagram showing a motor unit 20 according to a second embodiment of the present invention. The motor unit 20 comprises a motor controller 21 and the motor M. The motor controller 21 uses a sensorless driving method to drive the motor M. The motor controller 21 comprises the switch circuit 150, the control unit 160, a phase signal generating unit 270, and a back electromotive force detecting unit 280. The switch circuit 150 includes the first transistor 151, the second transistor 152, the third transistor 153, and the fourth transistor 154 for supplying a motor current to the motor M. The control unit 160 generates the first control signal C1, the second control signal C2, the third control signal C3, and the fourth control signal C4 so as to respectively control the ON/OFF states of the first transistor 151, the second transistor 152, the third transistor 153, and the fourth transistor 154. The phase signal generating unit 270 receives a back electromotive force signal Vb for generating a phase signal Vp to the control unit 160. The back electromotive force detecting unit 280 generates the back electromotive force signal Vb to the phase signal generating unit 270. By the asymmetrical silicon steel plate 110, the motor controller 21 may start the motor M and switch phases when the back electromotive force signal Vb is zero. That is to say, when the motor M is in a start state and the back electromotive force signal Vb is zero, the phase signal Vp is changed from a first level to a second level, so as to inform the control unit 160 to switch phases. In order to avoid that the back electromotive force signal Vb vibrates near 0 volt, the phase signal generating unit 270 may install an anti-noise circuit to avoid a malfunction. After the motor controller 21 switches phases, the motor controller 21 may enable a next phase switching time to be greater than a predetermined time. Furthermore, after the motor controller 21 switches phases, the motor controller 11 may result that it is allowed to switch the phase again when the back electromotive force signal Vb is greater than a positive value or less than a negative value. Thus, when the back electromotive force signal Vb is too small, the motor unit 20 will not misjudge the rotation direction of the fan 1, thereby increasing the success rate of starting the forward rotation.

After the motor controller 21 starts the motor M successfully, the motor M will change from the start state to a normal operation state. When the motor M is in the normal operation state, the motor controller 21 may also switch phases as the back electromotive force signal Vb is zero. That is to say, when the motor M is in the normal operation state and the back electromotive force signal Vb is zero, the phase signal Vp is changed from a first level to a second level, so as to inform the control unit 160 to switch phases. Thus, the phase signal generating unit 270 may generate the phase signal Vp for switching phases in the start state or the normal operation state. Both the phase signal generating unit 270 and the phase signal generating unit 170 may have the same circuit structure. Furthermore, the motor controller 21 may be applied to a single-phase motor system.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A motor unit, comprising:
a motor, wherein the motor comprises a silicon steel plate; and
a motor controller, wherein the motor controller comprises a switch circuit, a control unit, and a Hall sensor, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, and according to a forward rotation direction of a fan, the Hall sensor is installed in an advanced position with respect to a zero position of a mechanism.

2. A motor unit, comprising:
a motor, wherein the motor comprises a silicon steel plate; and
a motor controller, wherein the motor controller comprises a switch circuit and a control unit, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, the motor controller is configured to start the motor and switch phases when a Hall voltage is zero, and the Hall voltage is generated by a Hall sensor.

3. A motor unit, comprising:
a motor, wherein the motor comprises a silicon steel plate; and
a motor controller, wherein the motor controller comprises a switch circuit and a control unit, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, and after the motor controller switches phases, the motor controller enables a next phase switching time to be greater than a predetermined time.

4. A motor unit, comprising:
a motor, wherein the motor comprises a silicon steel plate; and a motor controller, wherein the motor controller comprises a switch circuit, a control unit, and a Hall sensor, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, the Hall sensor generates a first Hall signal and a second Hall signal, and after the motor controller switches phases, the motor controller results that it is allowed to switch a phase again when a difference value between the first Hall signal and the second Hall signal is greater than a positive value.

5. A motor unit, comprising:
a motor, wherein the motor comprises a silicon steel plate; and
a motor controller, wherein the motor controller comprises a switch circuit, a control unit, and a Hall sensor, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, the Hall sensor generates a first Hall signal and a second Hall signal, and after the motor controller switches phases, the motor controller results that it is allowed to switch a phase again when a difference value between the first Hall signal and the second Hall signal is less than a negative value.

6. A motor unit, comprising:
a motor, wherein the motor comprises a silicon steel plate; and
a motor controller, wherein the motor controller comprises a switch circuit and a control unit, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, when the motor is in a normal operation state, the motor controller switches phases as a Hall voltage is zero, and the Hall voltage is generated by a Hall sensor.

7. A motor unit, comprising:
a motor, wherein the motor comprises a silicon steel plate; and
a motor controller, wherein the motor controller comprises a switch circuit and a control unit, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, and the motor controller is configured to start the motor and switch phases when a back electromotive force signal is zero.

8. A motor unit, comprising:
a motor, wherein the motor comprises a silicon steel plate; and
a motor controller, wherein the motor controller comprises a switch circuit and a control unit, the motor controller is used for driving the motor, the switch circuit is configured to supply a motor current to the motor, the control unit generates a plurality of control signals to control the switch circuit, the silicon steel plate has an asymmetrical structure, such that a fan blade is inclined to a forward rotation direction in a still state, and when the motor is in a normal operation state, the motor controller switches phases as a back electromotive force signal is zero.

9. A motor controller used for driving a motor, and the motor controller comprising:
a switch circuit, configured to supply a motor current to the motor;
a control unit, configured to generate a plurality of control signals to control the switch circuit; and
a phase signal generating unit, configured to receive a Hall output signal for generating a phase signal to the control unit, wherein the motor controller starts the motor and switches phases when a Hall voltage is zero, and the Hall voltage is generated by a Hall sensor.

10. The motor unit of claim 9, wherein the phase signal generating unit further comprises an anti-noise circuit, and the anti-noise circuit is used for avoiding a malfunction.

11. The motor unit of claim 9, wherein after the motor controller switches phases, the motor controller enables a next phase switching time to be greater than a predetermined time.

12. The motor unit of claim 9, wherein after the motor controller switches phases, the motor controller results that it is allowed to switch a phase again when a difference value between a first Hall signal and a second Hall signal is greater than a positive value.

13. The motor unit of claim 9, wherein after the motor controller switches phases, the motor controller results that it is allowed to switch a phase again when a difference value between a first Hall signal and a second Hall signal is less than a negative value.

14. The motor unit of claim 9, wherein the phase signal generating unit comprises a first comparator, and the first comparator generates a first signal to switch phases by comparing the Hall output signal with a first reference voltage.

15. The motor unit of claim 14, wherein the phase signal generating unit further comprises a second comparator, and the second comparator generates a second signal by comparing the Hall output signal with a second reference voltage.

16. The motor unit of claim 15, wherein the phase signal generating unit further comprises a third comparator, and the third comparator generates a third signal by comparing the Hall output signal with a third reference voltage.

17. A motor controller used for driving a motor, and the motor controller comprising:
a switch circuit, configured to supply a motor current to the motor;
a control unit, configured to generate a plurality of control signals to control the switch circuit; and
a phase signal generating unit, configured to receive a Hall output signal for generating a phase signal to the control unit, wherein when the motor is in a normal operation state, the motor controller switches phases as a Hall voltage is zero, and the Hall voltage is generated by a Hall sensor.

18. The motor unit of claim 17, wherein the phase signal generating unit further comprises an anti-noise circuit, and the anti-noise circuit is used for avoiding a malfunction.

19. A motor controller used for driving a motor, and the motor controller comprising:
a switch circuit, configured to supply a motor current to the motor;

a control unit, configured to generate a plurality of control signals to control the switch circuit; and a phase signal generating unit, configured to receive a back electromotive force signal for generating a phase signal to the control unit, wherein the motor controller starts the motor and switches phases when the back electromotive force signal is zero, and the motor controller is applied to a single-phase motor system.

20. A motor controller used for driving a motor, and the motor controller comprising:

a switch circuit, configured to supply a motor current to the motor;

a control unit, configured to generate a plurality of control signals to control the switch circuit; and a phase signal generating unit, configured to receive a back electromotive force signal for generating a phase signal to the control unit, wherein when the motor is in a normal operation state, the motor controller switches phases as the back electromotive force signal is zero, and the motor controller is applied to a single-phase motor system.

* * * * *